(12) United States Patent
Lu et al.

(10) Patent No.: US 6,940,558 B2
(45) Date of Patent: Sep. 6, 2005

(54) STREAMING CONTENT ASSOCIATED WITH A PORTION OF A TV SCREEN TO A COMPANION DEVICE

(75) Inventors: Jin Lu, Croton-On-Hudson, NY (US); Martin Freeman, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 555 days.

(21) Appl. No.: 10/011,891

(22) Filed: Dec. 6, 2001

(65) Prior Publication Data

US 2003/0107677 A1 Jun. 12, 2003

(51) Int. Cl.$^7$ ................................................. H04N 5/44
(52) U.S. Cl. ..................... 348/553; 348/552; 348/576; 725/153
(58) Field of Search .................... 348/553, 565–568, 348/576, 561, 552, 734, 559; 725/133, 141, 153; 715/723

(56) References Cited

U.S. PATENT DOCUMENTS

| | | | | |
|---|---|---|---|---|
| 4,528,585 A | | 7/1985 | Bolger | ........................ 358/160 |
| 5,587,928 A | * | 12/1996 | Jones et al. | .................. 709/204 |
| 5,657,246 A | * | 8/1997 | Hogan et al. | ............... 348/14.1 |
| 6,052,155 A | | 4/2000 | Cherrick et al. | ............ 348/565 |
| 6,646,673 B2 | * | 11/2003 | Caviedes et al. | ......... 348/14.07 |

FOREIGN PATENT DOCUMENTS

| | | | |
|---|---|---|---|
| EP | 0825514 A2 | 2/1998 | ............. G06F/1/16 |
| EP | 1158786 A2 | 11/2001 | .......... H04N/5/232 |
| WO | WO0010327 | 2/2000 | .......... H04N/5/445 |

OTHER PUBLICATIONS

PHN 16,406 U.S. Appl. No. 09/090,104, filed Jun. 3, 1998 and re–filed as a CPA on Dec. 4, 2000. Inventors Ronaldus M. Oosterhout et al. Title: Navigating Through Television Programs.

* cited by examiner

Primary Examiner—Victor R. Kostak
(74) Attorney, Agent, or Firm—Dicran Halajian

(57) ABSTRACT

A television system allows extraction of a sub-image and streaming of the sub-image contents to an external device during a sequence of successive screen refresh intervals.

18 Claims, 4 Drawing Sheets

STREAMING CONTENT ASSOCIATED WITH A PORTION OF A TV SCREEN TO A COMPANION DEVICE

RELATED APPLICATIONS

The present application is related to U.S. application Ser. No. 09/935,885 (U.S. 010363, 702225) Aug. 23, 2001, which relates to capturing a broadcast channel and streaming the captured channel to another device, which is incorporated herein by reference.

I. BACKGROUND OF THE INVENTION

A. Field of the Invention

The invention relates to the field of image processing for digital television and interactive TV.

B. Related Art

Television can show multiple images on the same screen. WO 00/10327 shows capturing and storing part of a displayed image from a television screen. The part of the work that is stored is a "snapshot," i.e. a still image that constitutes an entire picture. Several snapshots can be combined to create a moving image. The document also shows enlarging, but not storing, a portion of an image

II. SUMMARY OF THE INVENTION

It would be advantageous to capture a stream of portions of images from a television screen and divert it elsewhere. This would have several advantages for the user. The user could enlarge or simply copy a particular part of a stream of images, such an as a particular actor or particular costume and communicate that to a friend or business associate. A business may designate one person to watch a large number of transmitted programs and route particular ones of interest to particular individuals, as required by the needs of the business.

The invention could also allow several screens to share the same receiver or communications port. Generally, a digital signal can contain a lot more information than can be viewed on one screen.

Objects and further advantages will be apparent in the following.

III. BRIEF DESCRIPTION OF THE DRAWING

The invention will now be described by way of non-limiting example with reference to the following drawings.

IV. DETAILED DESCRIPTION OF THE PREFERRED EMBODIMENTS

Herein, connections shown may be wired or wireless. Connections may be electrical, infrared, radio frequency, optical, or any other suitable type.

Figure 1A:
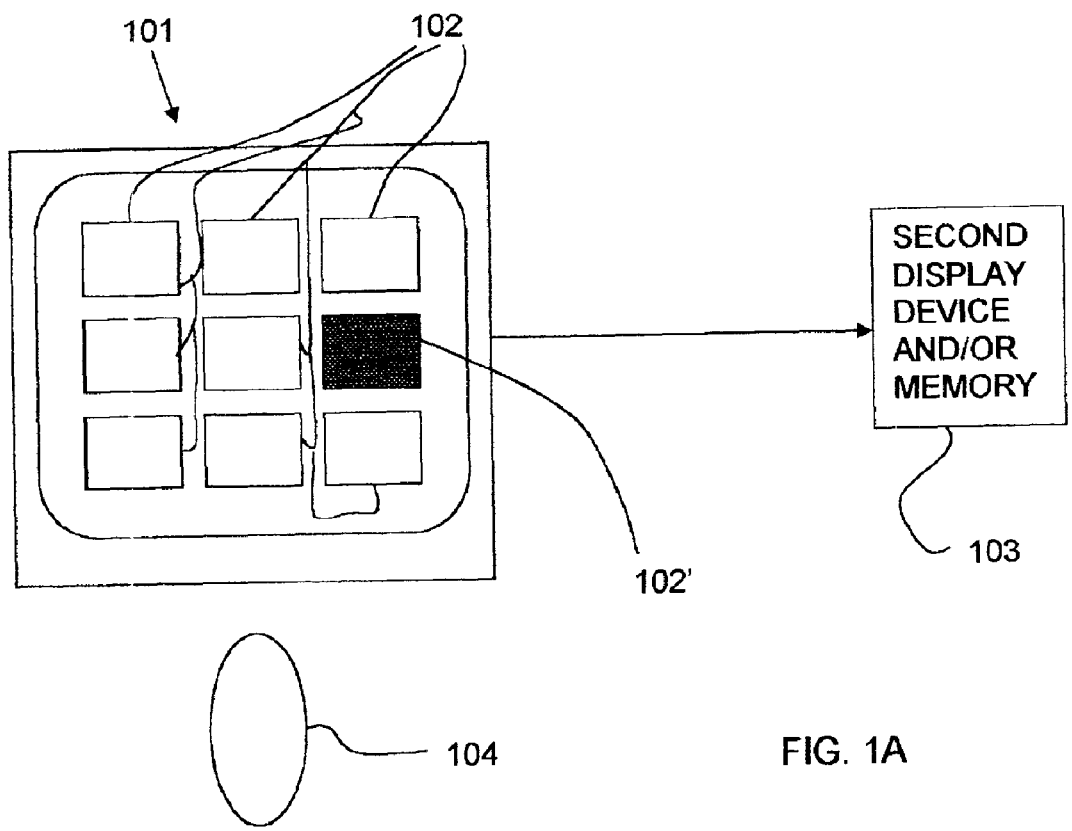
FIG. 1A shows a system in accordance with the invention.

FIG. 1A shows a system in accordance with the invention. The system includes a digital television 101, a remote 104, and a second display device 103. As used herein, the term "television" means any device capable of receiving and displaying a television signal.

Figure 1B:
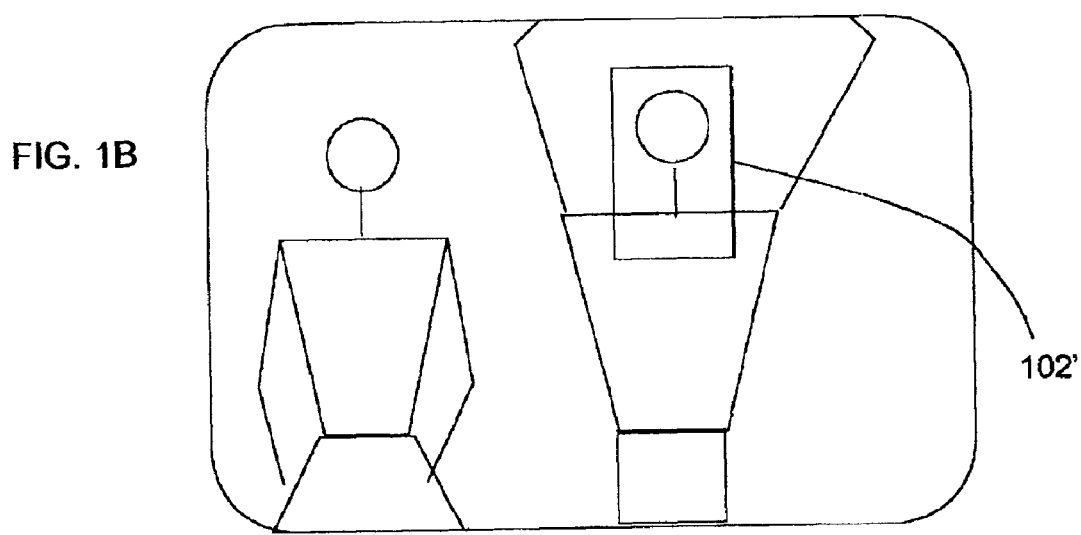
FIG. 1B shows an alternative version of the screen of FIG. 1A

The television may be arranged to display multiple, moving television images 102,102'. The multiple images may come from multiple sources, such as a cable network, a satellite network, the Internet, a telephony network (e.g. ADSL) and/or a terrestrial broadcast network; or they may come from a single source, such as multiple programs on a single channel. When the multiple images come from different sources, this can imply that a TV has several interfaces with multiple sources (an antenna for terrestrial, a modem for cable, etc.), and can combine and configure the programs from these different sources into a multiple-window screen. Alternatively, a cable operator may combine various programs at the cable operator's "headend" into one single stream, so that they come from a single source It is desired to choose a single sub image 102' using the remote 104. In FIG. 1A, there is a multiple window screen, and the illustrated sub image 102' is a single window. In general, the desired sub image may be any portion of the screen and may be associated with one or more windows. Taking a sub image does not require a multiple window screen. If the screen displays a single image, the sub image 102' will be part of the single image—as illustrated in FIG. 1B, where the head of one of the actors is selected as the sub image.

The second display device 103 may be a personal digital assistant. Instead of a second display device, a memory device such as a VCR might be used.

The remote 104 may be programmable and have a display, such as the Philips Pronto®. Alternatively, the second display may simply be the display on the remote.

Figure 3:
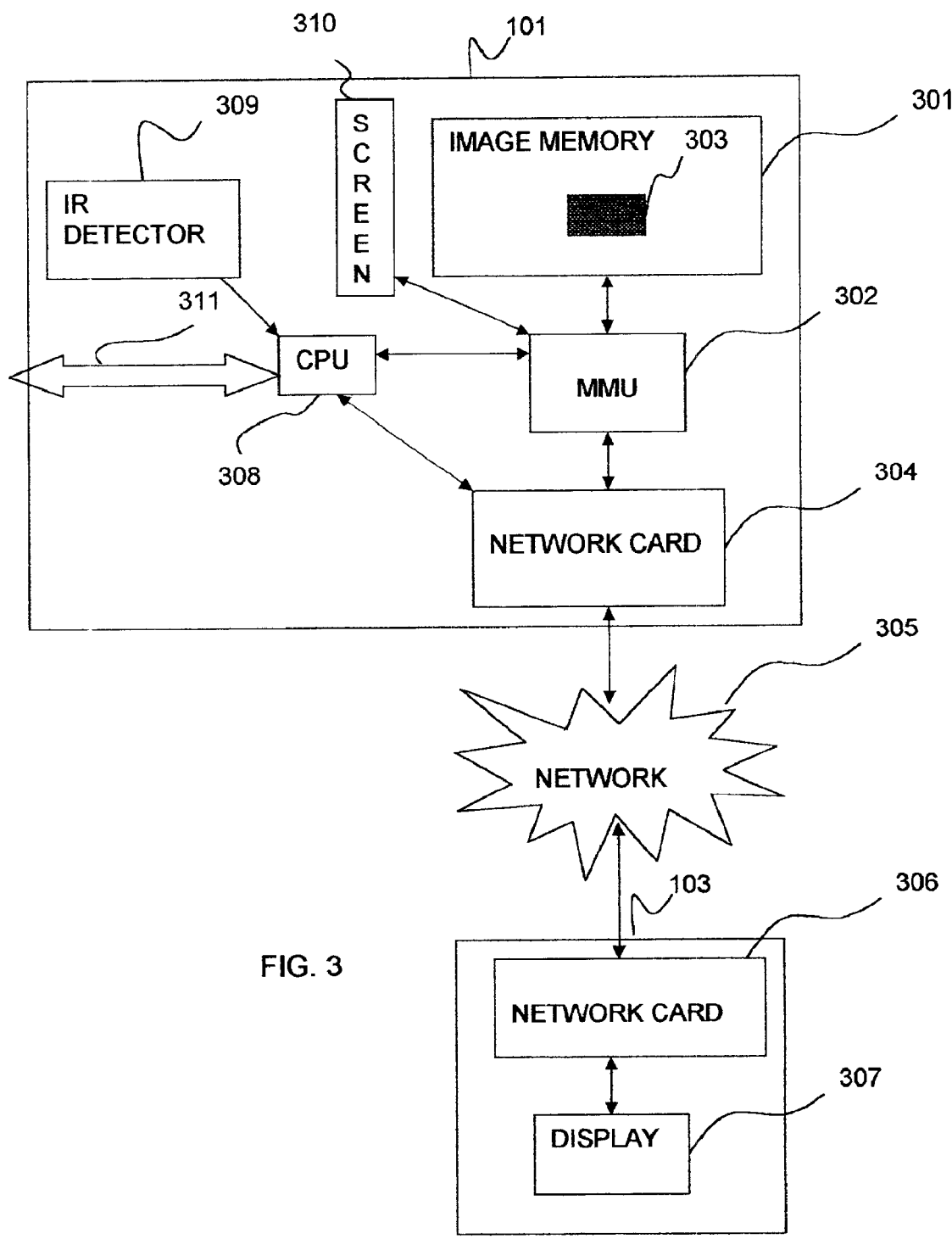
FIG. 3 shows more detail of the system of FIG. 1.

FIG. 3 shows more detail of the TV and second display device from FIG. 1.

The digital television 101 includes a screen 310 for displaying images. Contents of the sub-image on the screen 310 are communicated via the memory management unit 302 to be forwarded to the second display device 103 from an image memory 301. The image memory 301 includes a pixel storage location for each pixel on the screen 310. A portion of the image memory is highlighted at 303 to symbolize the pixel storage locations that correspond with 102' in FIGS. 1A and 1B.

Image data comes into the television set via bus 311. Image data may come from many sources, such as an antenna, a cable connection, and/or the Internet. The CPU 308 decides which signals to send to the memory management unit 302 based on instructions from a user. The CPU 308 might be of any relevant type, such as a digital image processing chip, or a Graphical User Interface (GUI) module. While the CPU is depicted as being inside the TV, it might equally well be implemented as a set top box Typically the user will communicate with the television using the remote 104, which communicates with the IR detector 309; but other communication avenues would be possible, such as a remote, with a radio frequency communication. Possibly the instructions might be communicated via a wired connection, such as from a keyboard or mouse, or some control devices on the television set such as dials or buttons.

The remote control (RC) 104 must have a way to define a portion of the TV screen where the content is to be streamed to another display device. One way is that the RC holder moves the pointer on the TV screen by rotating RC in the right-left direction and up-down direction. Then, when the holder moves the RC in the right-left direction, the pointer moves right and left on the screen; and when the holder moves the RC in the up-down direction, a pointer moves up and down on the screen. By rotating the RC, you can move the pointer to any point of the TV screen. Implementation of such an RC can be found in EP 825514.

A network card 304 is provided for facilitating streaming large amounts of data. Preferably the network card uses a standard communication protocol such as IEEE 1394 or IEEE 802.11b. The network card is connected to a network 305 by a wired or wireless connection. The network 305 may be a single line as shown in FIG. 1; or it may be a fill-fledged network such as a local area network (LAN) or the Internet.

The second display device 103 receives the streamed images from the network 305 via its own network card 306. It then displays the streamed images on its own display 307. The network card 306 must be compatible with the network card 304, or else the network 305 must have devices suitable for converting the images to a format compatible with card 306. Like the network card 306, the network card 305 will typically be in accordance with some standard such as IEEE 1394 or IEEE 802.11b. The connection between the network 305 and the second display device 103 may be wired or wireless.

Figure 2A:
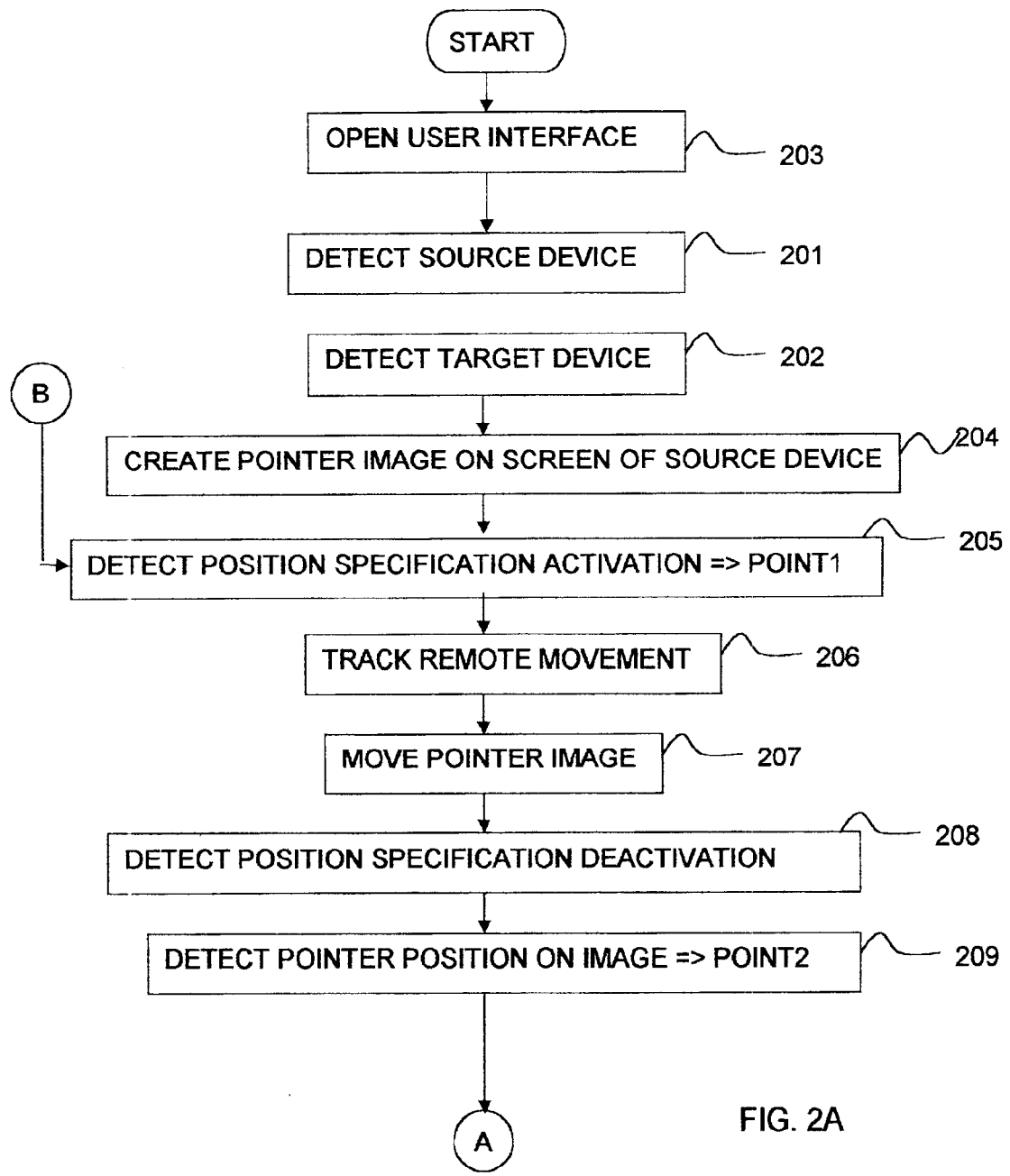
FIGS. 2A and 2B show a flow chart of processes used by the invention.
Figure 2B:
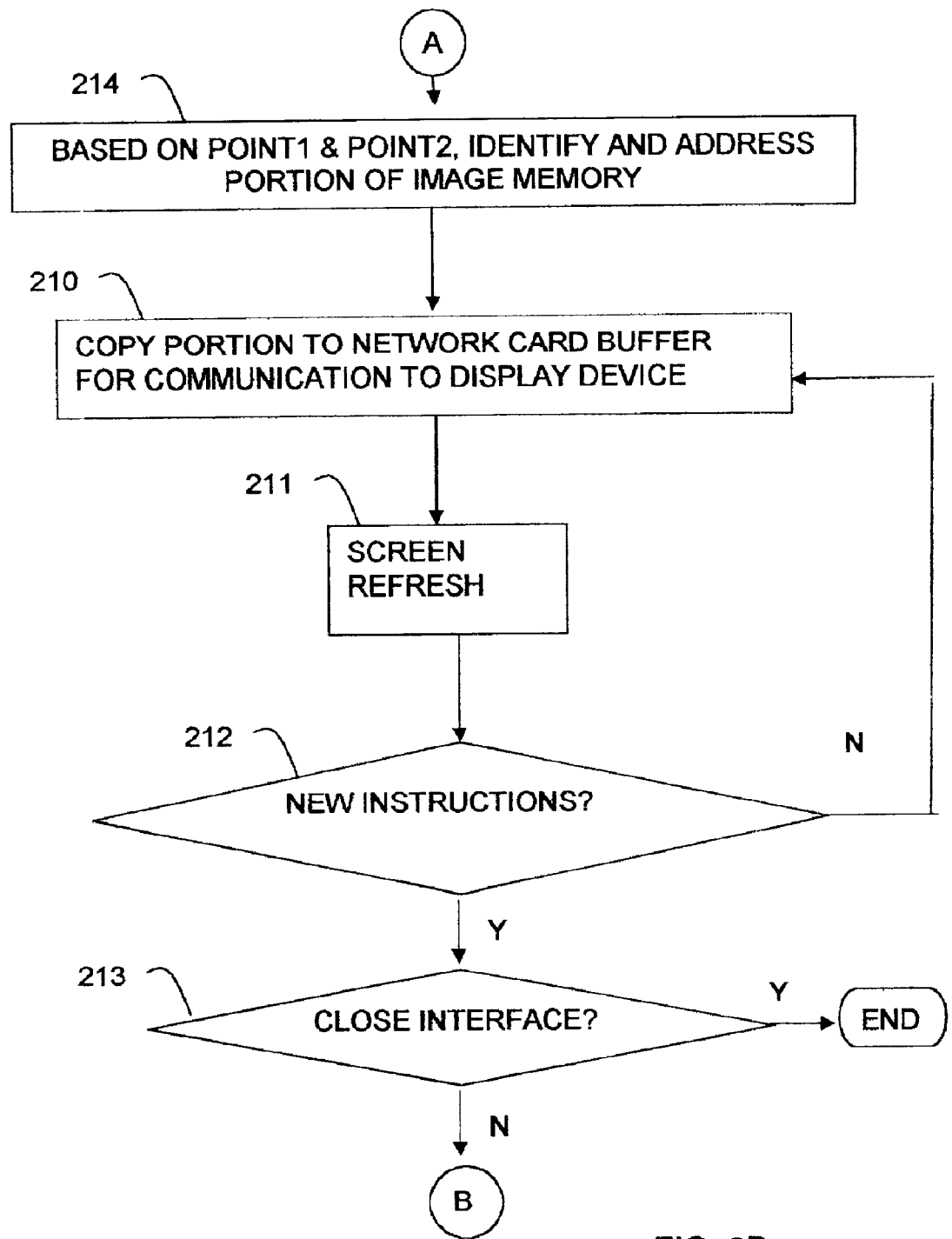

FIGS. 2A and 2B show a flow chart illustrating the operation of the invention. Normally this flowchart will be executed in the CPU 308, but remote or distributed execution would also be possible.

At 203, a user interface relating to sub image contents dreaming is opened.

At 201, the source device—in this case the television 101—is detected. At 202, a target device—in this case the second display device 103—is detected.

A pointer image is created on the screen at 204. Once the user is happy with the current pointer position, the user makes a position specification activation, which is detected at 205. Normally the position specification activation win result from the user pressing a button on the remote indicating a click on a current cursor position. The remote may have mechanical buttons, programmable buttons on a touch sensitive screen, or any other positions specification mechanism, many of which are known in the field of cursor control The position specification activation will indicate a first point called "point1." Then the remote 104—or other position specification device—is moved by the user and this motion is tracked at 206. The CPU causes the pointer to move along with the movement of the position specification device per 207. At 208, position specification deactivation is detected. This will usually result from the user lifting his or her finger from a button or touch sensitive screen on the remote. After position specification deactivation is detected, a current pointer position on the image is identified at 209 and designated as point2.

Per 214, based on point1 and point2, the CPU identifies for the memory management unit 302 a portion of the image data to be read from the image memory 301. If the portion is a rectangle, the rectangle will have a first defining corner at point1 and a second defining corner at point2. The first defining corner will be diagonally opposite from the second defining corner. While this embodiment is described with a rectangle in mind, one of ordinary skill in the art can easily devise other shapes, such as circles, which could be specified with a click and drag type scheme. In the case of a circle, the first and second points would indicate end points of a diameter of the circular portion.

At 210, the identified portion of data from the image memory is supplied to the network card 304, whence it will be streamed to the target device.

At 211, the CPU 308 detects a screen refresh, or frame boundary, and then looks for new instructions at 212. The new instructions would generally come from the remote 104, and might be in the form of a new position specification activation, or some other instruction. If no new instruction is detected, data continues to be copied from the rectangle. If a new instruction is detected, it is tested at 213 whether to close the interface. If the interface is closed the flowchart ends. If the interface is not closed, control passes back to box 205. At this juncture, the CPU might have to perform operations other than detecting a new position specification activation, such as changing volume or tint, but the possibility of performing such other operations is not shown because they would not be related to the invention.

From reading the present disclosure, other modifications will be apparent to persons skilled in the art. Such modifications may involve other features which are already known in the design, manufacture and use of digital televisions and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof whether or not it mitigates any or all of the same technical problems as does the present invention. The applicants hereby give notice that new claims may be formulated to such features during the prosecution of the present application or any further application derived therefrom The word "comprising", "comprise", or "comprises" as used herein should not be viewed as excluding additional elements. The singular article "a" or "an" as used herein should not be viewed as excluding a plurality of elements.

What is claimed is:

1. A television system comprising:
   an image memory comprising addressable pixel storage locations;
   a display for displaying pixels from the pixel storage locations;
   an input for receiving positional signals related to the display;
   a processing unit adapted to perform the following operations:
      defining a sub image section of the image memory, responsive to the positional signals; and
      reading a multiplicity of successive contents from the sub image section, during a respective multiplicity of successive screen refresh intervals;
   an output device for streaming the multiplicity of successive contents to an external device; and
   a remote controller for selecting a first point on said display by activation of a key and selecting a second point on said display by deactivation said key, said first and second points defining said sub image section.

2. The system of claim 1, wherein the defining operation comprises
   interpreting the positional signals to specify first and second points within the image memory; and
   identifying a portion of the image memory corresponding to the first and second points.

3. The system of claim 1, wherein the output device comprises a network card.

4. The system of claim 1, further comprising
   a remote control device for supplying the positional signals; and
   a second display device adapted to receive and display the streamed multiplicity of successive contents.

5. The system of claim 1, further comprising
a remote control device for supplying the positional signals; and
an external memory device adapted to receive and store the streamed multiplicity of successive contents.

6. A method of image processing comprising, executing the following operations in a television set:
displaying at least one displayed image;
receiving image location specification signals related to the displayed image;
recognizing a sub-image of the displayed image;
streaming contents of the sub-image to an external device during a multiplicity of successive screen refresh intervals;
activating a key of a remote controller to select a first point on a display of said television set that displays said displayed image; and
deactivation said key to select a second point on said display, said first and second points defining said sub-image.

7. The system of claim 1, wherein the images are included on a television signal broadcast from a signal source.

8. The system of claim 1, wherein the images are received from a broadcast signal source.

9. The system of claim 8, wherein the broadcast signal source includes a television broadcasting station.

10. The system of claim 1, wherein said first and second points define one of diagonally opposite corners of a rectangle that defines said sub image section and end points of a diameter of a circle that defines said sub image section.

11. The system of claim 1, wherein said multiplicity of successive contents from the sub image section continue to be streamed to said external device until new positional signals are received by said input.

12. The method of claim 6, wherein the at least one displayed image is included on a television signal broadcast from a signal source.

13. The method of claim 6, wherein the at least one displayed image is received from a broadcast signal source.

14. The method of claim 13, wherein the broadcast signal source includes a television broadcasting station.

15. The method of claim 6, wherein said first and second points define one of diagonally opposite corners or a rectangle that defines said sub-image and end points of a diameter of a circle that defines said sub-image.

16. A method of image processing comprising:
displaying at least one displayed image on a display;
receiving image location specification signals related to the displayed image;
recognizing a sub-image of the displayed image;
streaming contents of the sub-image to an external device during a multiplicity of successive screen refresh intervals;
wherein said recognizing operation includes receiving positional signals from a remote controller to define a sub-image section of said display for displaying said sub-image.

17. The method of claim 16, wherein said contents of the sub-image continue to be streamed to said external device until new positional signals are received by said remote controller.

18. An image processing system comprising:
means for displaying at least one displayed image on a display;
means for receiving image location specification signals related to the displayed image;
means for recognizing a sub-image of the displayed image; and
means for streaming contents of the sub-image to an external device during a multiplicity of successive screen refresh intervals;
wherein said recognizing operation includes receiving positional signals from a remote controller to define a sub-image section of said display for displaying said sub-image.

* * * * *